US008765281B2

(12) United States Patent
Kim (10) Patent No.: US 8,765,281 B2
(45) Date of Patent: Jul. 1, 2014

(54) RECHARGEABLE BATTERY AND BATTERY MODULE (75) Inventor: Yong-Sam Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 959 days.

(21) Appl. No.: 11/639,637

(22) Filed: Dec. 15, 2006

(65) Prior Publication Data
US 2007/0141452 A1 Jun. 21, 2007

(30) Foreign Application Priority Data
Dec. 19, 2005 (KR) .................. 10-2005-0125237

(51) Int. Cl.
H01M 10/50 (2006.01)
H01M 2/02 (2006.01)

(52) U.S. Cl.
USPC ............. 429/120; 429/96; 429/100; 429/148; 429/162; 429/163; 206/703

(58) Field of Classification Search
CPC ... H01M 2/02; H01M 2/0207; H01M 2/0222; H01M 2/021; H01M 2/0217; H01M 2/0265; H01M 2/0267
USPC .................. 429/120, 148, 163, 96, 100, 162; 206/703
See application file for complete search history.

(56) References Cited

U.S. PATENT DOCUMENTS

| 3,320,095 | A | * | 5/1967 | Bingeman et al. | 429/151 |
| 5,492,779 | A | * | 2/1996 | Ronning | 429/120 |
| 5,536,595 | A | * | 7/1996 | Inkmann et al. | 429/120 |
| 5,756,227 | A | * | 5/1998 | Suzuki et al. | 429/62 |
| 5,866,276 | A | * | 2/1999 | Ogami et al. | 429/120 |
| 5,958,088 | A | * | 9/1999 | Vu et al. | 29/623.1 |
| 6,033,800 | A | * | 3/2000 | Ichiyanagi et al. | 429/176 |
| 6,087,038 | A | * | 7/2000 | Flament et al. | 429/120 |
| 6,309,776 | B1 | * | 10/2001 | Okajima et al. | 429/151 |
| 6,399,238 | B1 | * | 6/2002 | Oweis et al. | 429/99 |

(Continued)

FOREIGN PATENT DOCUMENTS

| JP | 10-214605 | 8/1998 | |
| JP | 11-25932 | 1/1999 | |
| JP | 11-144766 | * 5/1999 | H01M 10/40 |
| JP | 2003-209659 | 7/2003 | |
| JP | 2005-78805 | 3/2005 | |

OTHER PUBLICATIONS

Patent Abstracts of Japan, Publication No. 2005-078805; Publication Date: Mar. 24, 2005; in the name of Eto et al.

(Continued)

Primary Examiner — Ula C Ruddock
Assistant Examiner — Amanda Barrow
(74) Attorney, Agent, or Firm — Christie, Parker & Hale, LLP (57) ABSTRACT A rechargeable battery includes an electrode assembly having a positive electrode, a negative electrode and a separator separating the positive terminal and the negative terminal. A casing includes a spatial area for receiving and holding the electrode assembly. A heat dissipating body is provided for receiving and holding the casing. A convex part of the heat dissipating body is formed supporting the electrode assembly within the heat dissipating body so that uniform pressure is applied to the entire surface of the rechargeable battery. A battery module may include multiple unit rechargeable batteries. A heat dissipating barrier may be disposed adjacent to each unit rechargeable battery and have a convex part for applying pressure to the unit rechargeable battery.

17 Claims, 5 Drawing Sheets

(56) References Cited

U.S. PATENT DOCUMENTS

| | | | |
|---|---|---|---|
| 6,440,602 B1* | 8/2002 | Morita | 429/120 |
| 6,451,474 B1* | 9/2002 | Kozu et al. | 429/100 |
| 6,586,132 B1* | 7/2003 | Fukuda et al. | 429/120 |
| 6,933,076 B2* | 8/2005 | Ura et al. | 429/164 |
| 7,410,722 B2* | 8/2008 | Iwamura et al. | 429/159 |
| 2002/0012603 A1* | 1/2002 | Miwa | 420/485 |
| 2002/0071986 A1* | 6/2002 | Exnar | 429/94 |
| 2003/0035993 A1* | 2/2003 | Enomoto et al. | 429/66 |
| 2003/0082439 A1* | 5/2003 | Sakakibara | 429/120 |
| 2004/0058233 A1* | 3/2004 | Hamada et al. | 429/159 |
| 2005/0263880 A1* | 12/2005 | Igarashi et al. | 257/723 |

OTHER PUBLICATIONS

Patent Abstracts of Japan for Publication No. 10-214605; dated Aug. 11, 1998, in the name of Atsushi Yanai, et al.

Patent Abstracts of Japan for Publication No. 11-025932; dated Jan. 29, 1999, in the name of Keisuke Yamamoto, et al.

Patent Abstracts of Japan for Publication No. 11-144766; dated May 28, 1999, in the name of Tatsuya Kajiyama, et al.

Patent Abstracts of Japan for Publication No. 2003-209659; dated Jul. 25, 2003, in the name of Tatsuo Ito.

* cited by examiner

RECHARGEABLE BATTERY AND BATTERY MODULE

CROSS-REFERENCE TO RELATED APPLICATION

This application claims priority to and the benefit of Korean Patent Application No. 10-2005-0125237 filed in the Korean Intellectual Property Office on Dec. 19, 2005, the entire contents of which is incorporated herein by reference.

BACKGROUND OF THE INVENTION

1. Field of the Invention

The present invention relates to a rechargeable battery and a battery module, and more particularly, to the rechargeable battery and the battery module having an improved structure for supporting an electrode assembly.

2. Description of the Related Art

In contrast to a primary battery incapable of charging, the rechargeable battery is a battery capable of charging and discharging.

Rechargeable batteries of a small capacity may be used for small portable electronic equipment such as cellular phones, notebook computers, camcorders and the like. Rechargeable batteries of a large capacity, wherein multiple cells are connected in the form of a pack or module, may be used as a power supply for driving motors, such as those used in hybrid electric vehicles, and the like.

The rechargeable battery (also generally referred to as a unit battery) can be manufactured in various forms, such as a pouched type, a cylindrical type, or an angular type.

Among others, the pouched type of the battery is widely used for slim and light-weight portable electronic equipment due to its relatively modifiable and light-weight properties.

Thus, in contrast to the casing of the cylindrical or the angular type of the battery molded by a thick metal material, the casing of the pouched type of the unit battery has a structure capable of bending freely since both surfaces of a thin metal film are attached to an insulating film. In addition, the inside of the casing is provided with a spatial area capable of holding the electrode assembly. Also, a sealing surface heat-fused along the periphery of the spatial area is provided.

For the conventional pouched type of the unit battery, it is very difficult to apply a separate structure for improving a heat radiating property to the casing, since the casing itself forming an outside of the battery is made of a flexible material that is typically weak in strength.

Thus, conventionally, the heat dissipating body is separately manufactured of a hard material and is used as the structure for receiving and holding the pouch.

However, the disadvantage of the conventional heat dissipating body is that it cannot apply pressure uniformly to the entire pouch. A planar type of heat dissipating body cannot uniformly apply a pressure to the entire electrode assembly since the electrode assembly inserted into the pouch may have a dumbbell-shaped sectional structure.

SUMMARY OF THE INVENTION

In accordance with the present invention a rechargeable battery is provided which extends the battery life by applying pressure uniformly over the entire surface of the rechargeable battery and maintains a constant pressure.

The rechargeable battery according to an embodiment of the present invention includes an electrode assembly having a positive electrode, a negative electrode and separator separating the positive electrode and the negative electrode. A positive terminal is electrically connected to the positive electrode and a negative terminal is electrical connected to the negative electrode. A casing includes a spatial area therein for receiving and holding the electrode assembly and is arranged to expose the positive and negative terminals. A heat dissipating body is provided for receiving and holding the casing. The heat dissipating body applies pressure on the electrode assembly through the casing.

The electrode assembly held in the casing has a structure such that the negative electrode, the positive electrode and the separator are wound. A planar part and a bended part are formed. The bended part has a structure that is relatively thicker than the planar part as a result of a space formed when winding the bended positive electrode, negative electrode and separator.

The heat dissipating body may include a convex part disposed adjacent to the planar part.

The heat dissipating body may have a structure such that its inner sectional shape corresponds to that of the planar part and the bended part of the electrode assembly.

The thickness of the convex part may correspond to the thickness difference between the planar part and the bended part of the electrode assembly.

The convex part may be formed as a flat structure.

The inner periphery of the heat dissipating body may have a dumbbell-shaped cross section.

The middle portion of the convex part may protrude inside more than end portions of the convex part.

The convex part may be formed as an inwardly extending structure.

The casing may be formed as a pouched structure.

The heat dissipating body may include aluminum or copper.

The heat dissipating body may include multiple heat radiating ribs protruding to the outside thereof.

The heat radiating ribs and the heat dissipating body may be integrally formed.

A battery module may include multiple unit batteries, each having a heat dissipating barrier disposed adjacent to a respective unit battery and have a convex part for applying pressure to the unit battery.

The heat dissipating barrier may include multiple heat radiating ribs fixed to the surface thereof.

The heat dissipating barrier may be formed in tubular shape having a space for inserting the unit battery therein.

The inner periphery of the heat dissipating barrier may have a dumbbell-shaped cross section.

DETAILED DESCRIPTION

Figure 1:
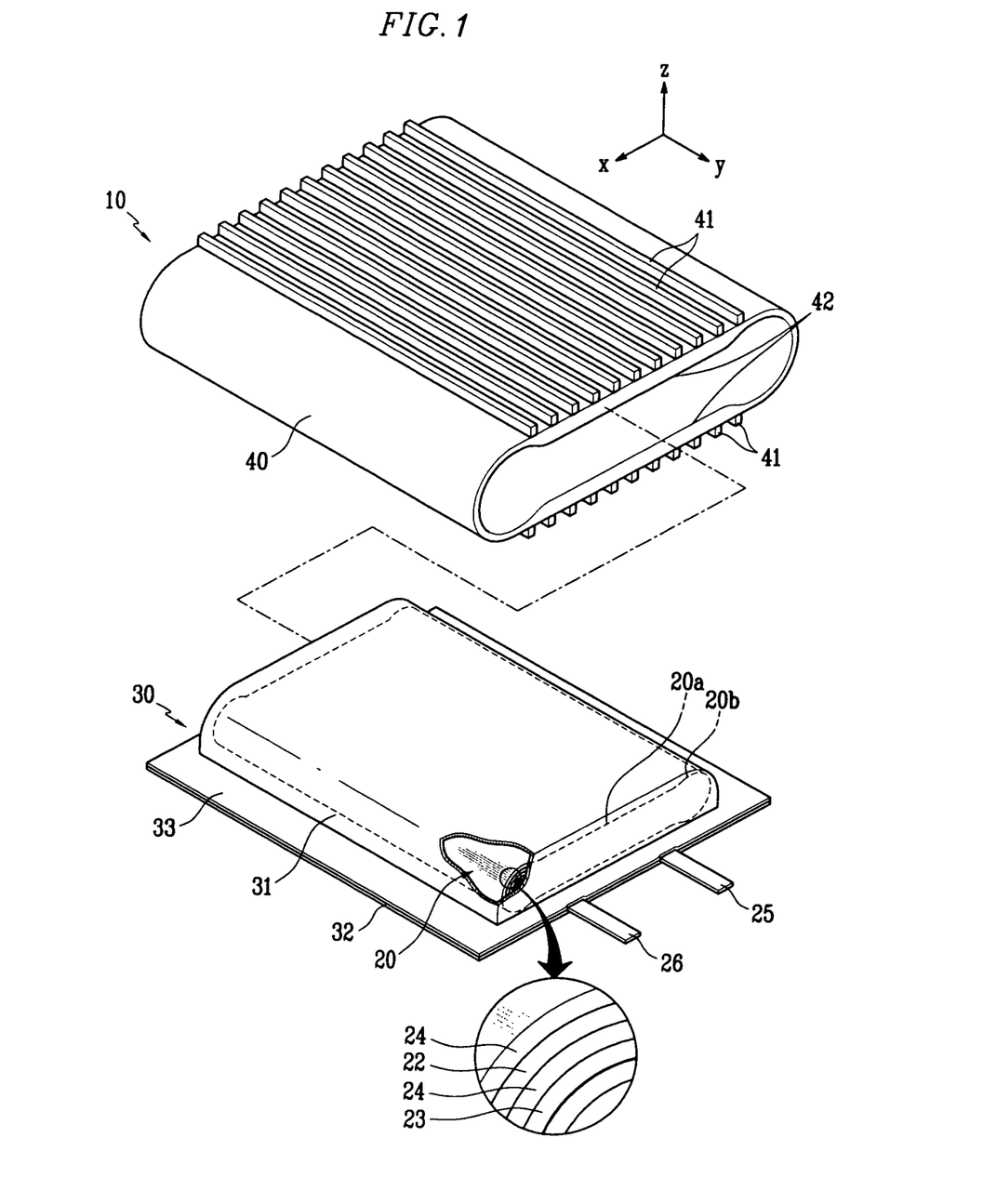
FIG. 1 is a perspective view showing a configuration of a rechargeable battery according a first embodiment of the present invention.
Figure 2:
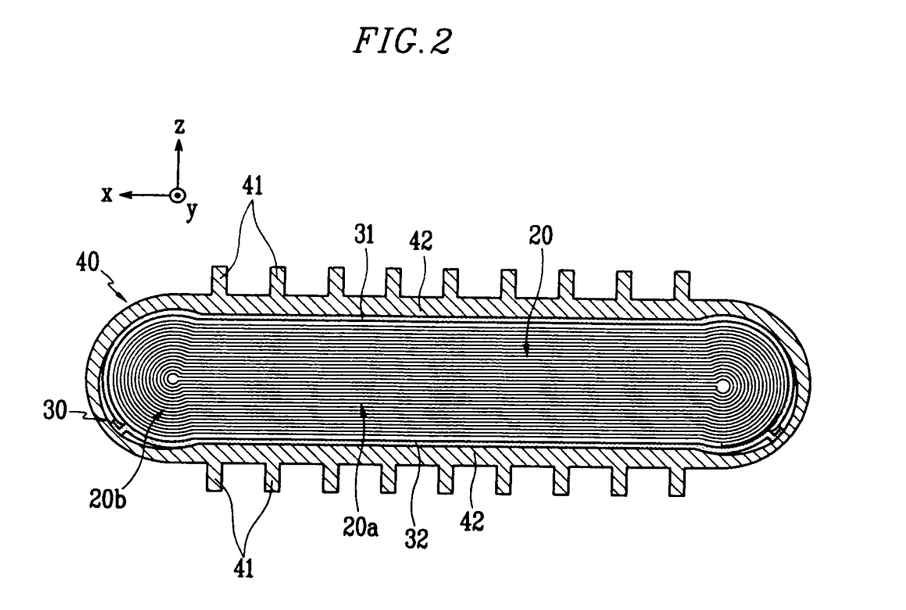
FIG. 2 is a cross-sectional view showing the rechargeable battery according to the first embodiment of the present invention.

With reference to FIGS. 1 and 2, the unit battery 10 according to the present embodiment includes an electrode assembly 20 rolled with a separator 24 inserted between a positive electrode 22 and a negative electrode 23, a pouched casing 30 having the electrode assembly 20 built therein, and a heat dissipating body 40 having the casing 30 inserted therein and radiating heat transferred from the casing 30.

The electrode assembly 20 is formed in a jelly roll configuration such that a positive electrode 22 and a negative electrode 23 are stacked to be rolled with the separator 24 inserted therebetween.

In the present embodiment, the electrode assembly 20 rolled in the jelly roll configuration is formed such that the middle portion thereof is flat and the end portions thereof are circularly curved, and can be characterized as being dumbbell-shaped.

Hereinafter, for the simplicity of description, in the electrode assembly 20 the middle portion thereof with the flat shape is referred to as a planar part 20a, and the circularly curved part at both ends of the planar part is referred to as a bended part 20b.

Thus, because multiple positive electrodes 22, negative electrodes 23 and separators 24 are bent to 180 degrees, the bended part 20b is unable to be rolled fully due to the tension difference between the inner and outer part of the electrode assembly 20. A space is thereby formed in the middle thereof.

Thus, the cross-section of the bended part 20b is relatively thicker than that of the planar part 20a due to the space in the middle thereof. In addition, a positive lead 25 electrically connected to the positive electrode 22 and a negative lead 26 electrically connected to the negative electrode 23 are arranged to protrude from the outside of the casing 30.

The positive lead 25 and the negative lead 26 are formed with a sufficient length such that they can protrude outside the pouched casing 30, and the portion adjacent to the casing 30 is sealed tightly with a sealant, or the like, to maintain the casing airproof.

FIG. 1 depicts a unit cell having a structure with the two spaced leads 25, 26 protruding in one direction. However, the two leads may be arranged to protrude in opposite directions.

As shown in FIG. 1, the pouched casing 30 includes a concavely formed main body 31 for holding the electrode assembly 20 and a cover 32 for sealing the main body 31. The main body 31 and the cover 32 have outside extended flanges 33 for bonding them together, the cover 32 and the main body 31 being bonded through a bonding between the flanges 33 to seal the inside of the casing 30.

The shape of the pouched casing is not limited to that described above. A pocket-shaped pouch casing may be implemented wherein one opened area holds the electrode assembly and the opened area is sealed.

In addition, the casing 30 having the structure as described above may include a thin plate made of a metal material and a resin material, and an inside of a thin metal plate, such as aluminum, forms a heat bonded layer such as a transformed polypropylene of a polymer resin. In addition, an outside thereof is pressed by inserting an exterior resin material such as nylon or polyethyleneterephthalate.

Thus, the pouched casing 30 can be sealed by a heat press when the heat bonding layer of the main casing body 31 and the pouched cover 32 come in contact with each other.

In addition, as shown in FIG. 1, the heat dissipating body 40 has a structure with at least one end thereof being opened such that a spatial area of a size corresponding to that of the casing 30 can be formed and the casing 30 can be inserted into the spatial area.

The heat dissipating body 40 may be made of a metal material, such as copper or aluminum, having an excellent heat transfer property. On the outer surface of the heat radiation body 40, there are provided multiple heat radiating ribs 41.

The heat radiating ribs 41 and the heat dissipating body 40 may be integrally formed, and the heat radiating ribs 41 according to the present embodiment has a structure such that each rib extends continuously along the direction in which the casing 30 is inserted (e.g., along the y axis of FIG. 1).

Those skilled in the art can appreciate that the height and size by which the heat radiating ribs 41 protrude and the space between the heat radiating ribs 41 can be of various dimensions as the heat radiation need demands.

In addition, in the present embodiment, the heat radiating ribs 41 protrude from the outside surfaces of both sides of the relatively large central area of heat dissipating body 40, but is not necessarily so limited. For example, the heat radiating ribs 40 may protrude from all external surfaces of the heat dissipating body 41.

In addition, the shape of the inside space of the heat dissipating body 40 corresponds to that of the electrode assembly 20 and the casing 30 holding the electrode assembly 20.

To describe this correspondence in more detail, as seen in FIG. 2 looking at inside of the heat dissipating body 40, the convex part 42 is formed at a place corresponding to that of the planar part 20a of the electrode assembly 20 in a shape corresponding to that of the planar part 20a.

Thus, the portion of the heat dissipating body 40 at which the bended part 20b of the electrode assembly is located is thicker than the portion at which the planar part 20a is located. In other words, the width of the inside of the heat dissipating body 40 in which the convex part 42 is formed is narrower than that of both ends thereof in which the convex part 42 is not formed.

The reason is that the electrode assembly 20 is formed in the general shape of a dumbbell having a bended part 20b and a planar part 20a. In addition, both sides (along the x axis) connecting the convex part are formed in a curved surface having an arc section. As such, the inside of the heat dissipating body 40 is also dumbbell-shaped to correspond to that of the electrode assembly 20.

Thus, when the casing 30 holding the electrode assembly 20 is inserted into the heat dissipating body 40, the sectional shape of the inside of the heat dissipating body 40 corresponds to that of the electrode assembly 20 formed in a dumbbell shape by the bended part 20b and the planar part 20a.

Therefore, the convex part 42 formed in the middle of the heat dissipating body 40 applies a constant pressure the planar part 20a of the electrode assembly 20 having a relatively narrow width and the heat dissipating body 40 similarly applies a constant pressure to the bended part 20b of the electrode assembly 20 located at both sides of the heat dissipating body 40 having a relatively wide width.

Thus, by forming the convex part 42 having a shape corresponding to that of electrode assembly 20 in the heat dissipating body 40 it is possible to apply a constant pressure to the entire surface of the electrode assembly 20 and avoid the deterioration of the battery life due to non-constant pressure.

Figure 3:
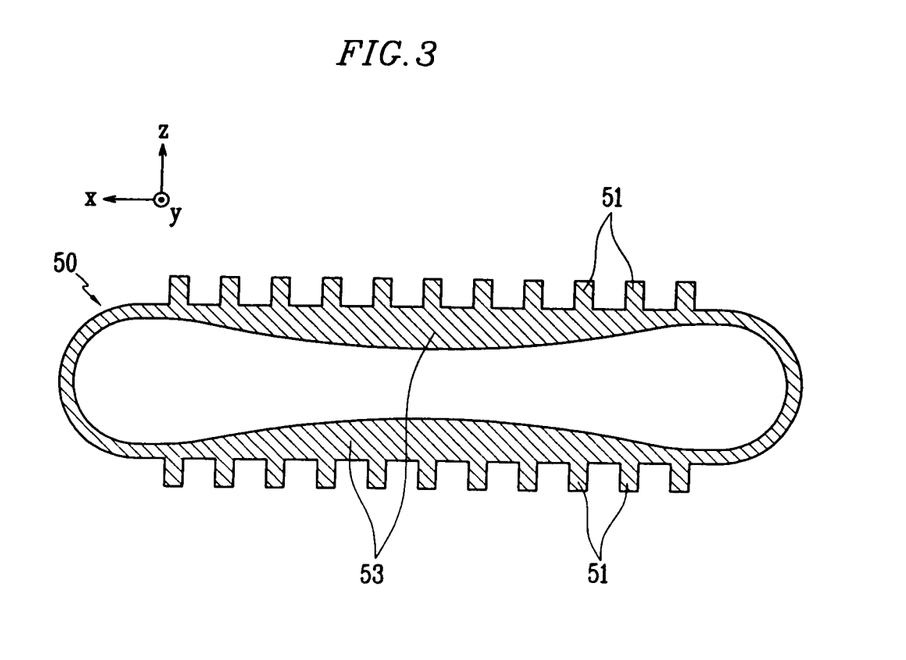
FIG. 3 is a cross-sectional view showing a heat dissipating body of the rechargeable battery according to a second embodiment of the present invention.

FIG. 3 is a cross-sectional view showing the heat dissipating body according to the second embodiment of the present invention.

As seen in FIG. 3, a heat dissipating body 50 includes a convex part 53 for applying pressure to planar part 20a of the electrode assembly 20 (shown in FIG. 1), the convex part 53 protruding in an arc shape forming a gentle curve toward the inside of the heat dissipating body 50. Thus, the convex part 53 grows thicker from the both ends thereof towards the middle thereof.

In addition, the heat dissipating body 50 includes multiple heat radiating ribs 51, the heat radiating ribs 51 have the same structure as that of the heat radiating ribs according to the above-described first embodiment.

The heat dissipating body 50 according to the present embodiment is formed in a continuously curved shape, thereby preventing a non-constant pressure from being applied to the electrode assembly 20 in a discontinuous portion thereof, such as a corner.

Figure 4:
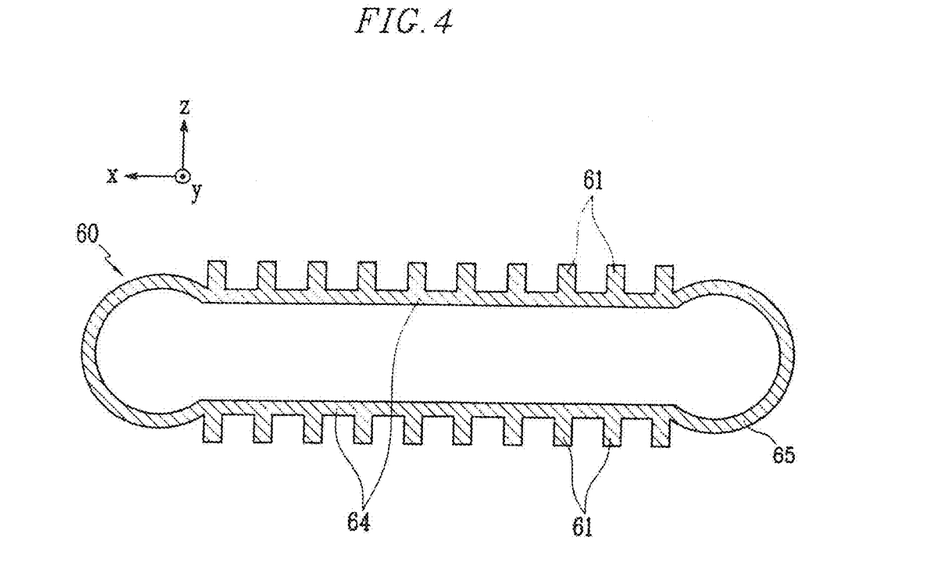
FIG. 4 is a cross-sectional view showing the heat dissipating body of the rechargeable battery according to a third embodiment of the present invention.

FIG. 4 is a cross-sectional view showing a heat dissipating body according to the third embodiment.

As seen in FIG. 4, the heat dissipating body 60 according to the present embodiment includes a convex part 64 which extends from the outside to the inside at both sides opposed each other to protrude to the inside. Thus, at the portion in which the convex part 64 is formed, the space between the inside surfaces is shortened.

In other words, the heat dissipating body 60 has a constant thickness and in the middle thereof, the convex part 64 is extended inward. The convex part 64 has a cross-section of a straight line shape for stably supporting the planar part 20a of the electrode assembly 20 (shown in FIG. 1).

In addition, on both sides of the convex part 64, a surface 65 having a section of a circular arc connects the convex part 64 opposed each other, thus the heat dissipating body 60 has a sectional structure of a dumbbell shape. In addition, on the outside surface of the heat dissipating body 60, multiple heat radiating ribs 61 are formed to radiate a heat efficiently.

Thus, according to the present invention, because the shape of the heat dissipating body 60 corresponds to that of the electrode assembly 20, it is possible to support the electrode assembly 20 stably as well as to minimize the weight of the heat dissipating body 60.

Figure 5:
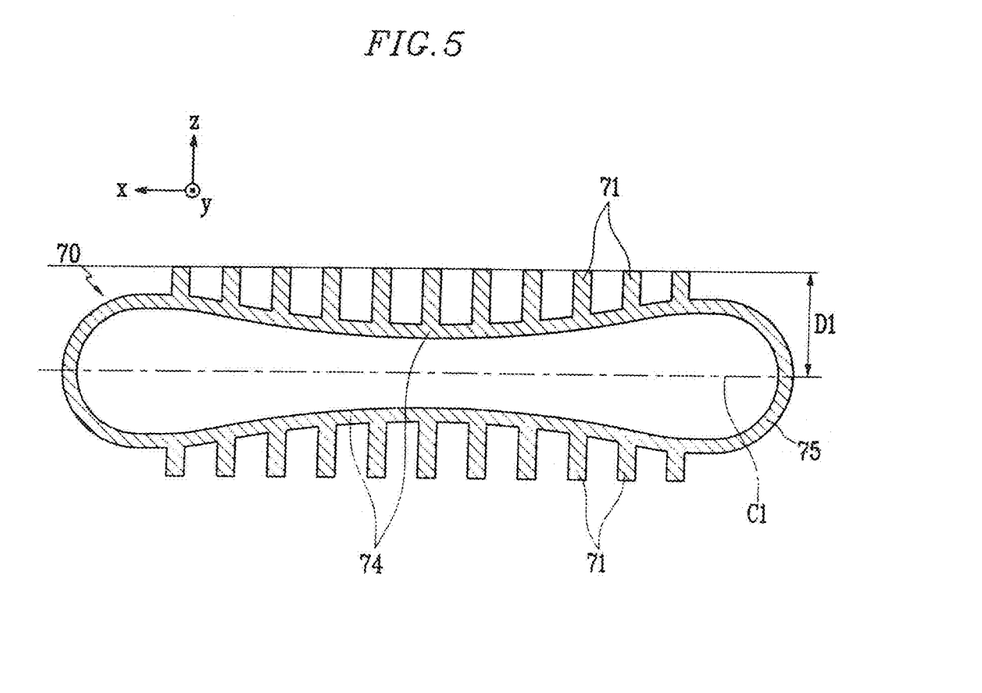
FIG. 5 is a cross-sectional view showing the heat dissipating body of the rechargeable battery according to a fourth embodiment of the present invention.

FIG. 5 is a cross-sectional view showing a rechargeable battery according to the fourth embodiment of the present invention.

As seen in FIG. 5, the heat dissipating body 70 includes a convex part 74 for applying pressure to planar part 20a of electrode assembly 20 (shown in FIG. 1). The convex part 74 is formed to extend inward and protrudes toward the inside of the heat dissipating body 70 in an arc shape forming a gentle curve. Thus, the inner width of the convex part 74 grows narrower from the both ends to the middle thereof.

The heat dissipating body 70 according to the present invention has a constant thickness, thus the opposite side of the convex part 74 is formed to be in a concave shape.

In addition, on the outside of the heat dissipating body 70, multiple heat radiating ribs 71 are formed to radiate heat efficiently. The outside end of the heat radiating ribs 71 are located at the same distance D1 from a centerline C1 of the heat dissipating body 70, in other words, although the positions to which the heat radiating ribs 71 are fixed differently due to the outside of the heat dissipating body 70 being formed in a curved shape, each end of the heat radiating ribs has the same coordinate along the z axis.

The heat dissipating body 70 according to the present embodiment is formed in a continuously curved shape, thereby preventing a non-constant pressure from being applied to the electrode assembly 20 in a discontinuous portion, such as a corner.

Figure 6:
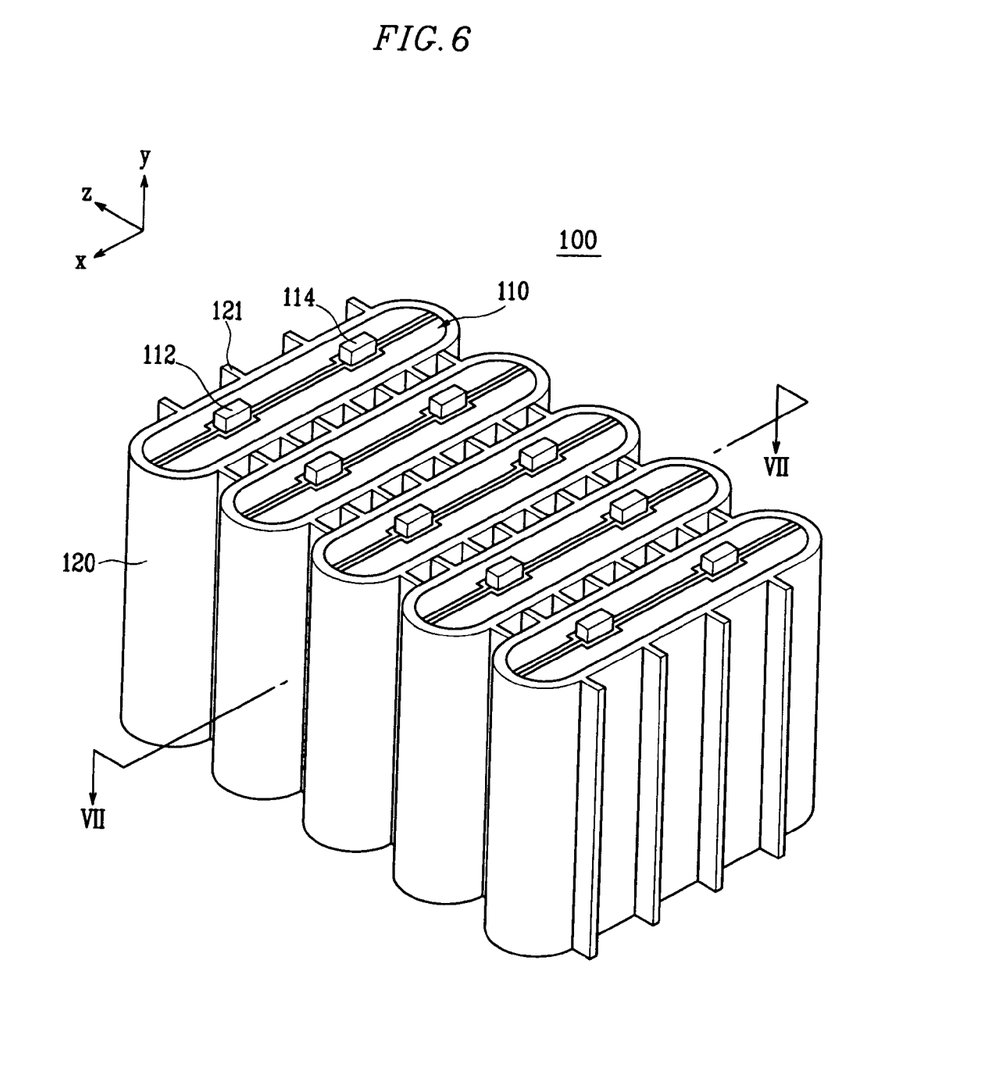
FIG. 6 is a perspective view showing a battery module according to a fifth embodiment of the present invention.
Figure 7:
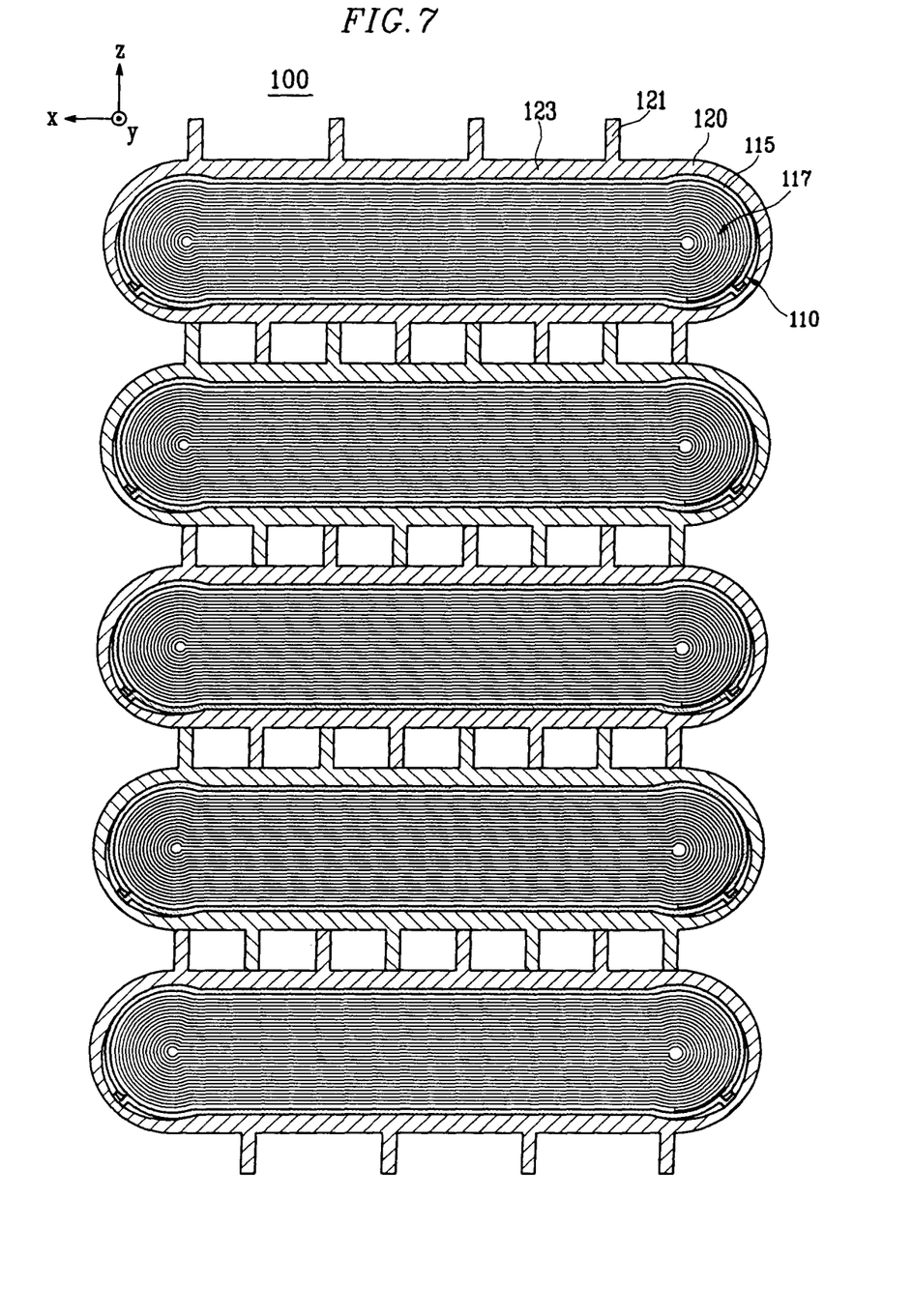
FIG. 7 is a cross-sectional view taken along line VII-VII of FIG. 6

FIG. 6 is a perspective view showing a battery module according to the fifth embodiment of the present invention and FIG. 7 is a cross-sectional view taken along line VII-VII of FIG. 6.

As seen in FIGS. 6 and 7, a battery module 100 according to the present embodiment includes multiple unit batteries 110 and a heat dissipating barrier 120 disposed at the outside of the unit batteries 110.

The unit batteries 110 include an electrode assembly 117 having a separator inserted between a positive electrode and a negative electrode, a positive terminal 112 and a negative terminal 114 electrically connected to the electrode assembly 117 to protrude outward and a casing 115 having the electrode assembly 117 inserted therein.

The casing 115 according to the present embodiment has a pouched structure surrounding the electrode assembly.

On the outside of the casing 115, there is provided a heat dissipating barrier 120 forming a flow path for a cooling medium. The heat dissipating barrier 120 according to the present embodiment is formed in a tubular shape having at least one end thereof opened to insert the unit battery 110.

However, the heat dissipating barrier structure of the tubular shape is only an exemplary embodiment, and the present invention is not limited thereto. Therefore, the heat dissipating barrier may be formed in a plate shape to contact the surfaces of the unit batteries.

In the inside of the heat dissipating barrier 120 according to the present embodiment, there is provided a convex part 123 protruding inward to apply pressure to the electrode assembly 117. Thus, the convex part 123 is formed in a shape corresponding to that of the planar part 20a to stably press the planar part 20a of the electrode assembly 117.

In addition, on the outside surface of the heat dissipating barrier 120, there are provided multiple heat radiating ribs 121. The heat radiating ribs 121 are disposed spaced apart such that the heat radiating ribs 121 formed on both sides of the heat dissipating barrier 120 cross each other. In other words, when stacking multiple unit batteries 110, the heat radiating ribs 121 of adjacent heat dissipating barriers 120 are disposed between the heat radiating ribs 121.

Thus, according to the present embodiment, it is possible to stably apply pressure to the electrode assembly 117 by forming the convex 123 part in the heat dissipating barrier 120 and to cool down the unit batteries 110 efficiently by forming the path for passing the cooling medium.

Thus, according to the embodiments of the present invention, it is possible to apply a uniform pressure to the entire surface of the electrode assembly to maximize the battery life.

In addition, in the pouched type of the rechargeable battery, it is possible to radiate the inside heat rapidly by improving the heat radiating property.

Although the exemplary embodiments of the present invention have been described, the present invention is not limited to the embodiments, but may be modified in various forms without departing from the scope of the appended claims, the detailed description, and the accompanying drawings of the present invention. Thus, such modifications should fall within the scope of the present invention.

What is claimed is:

1. A rechargeable battery comprising:
an electrode assembly comprising a positive electrode, a negative electrode and a separator separating the positive electrode and the negative electrode, the electrode assembly including bended parts at opposite ends and a central part between the bended parts, a thickness of the central part being less than that of the bended parts such that the electrode assembly has a dumbbell shape in which each of opposite sides of the central tart corn rises a flat surface or is protruded inward toward a midplane of the electrode assembly;
a positive terminal electrically connected to the positive electrode and a negative terminal electrically connected to the negative electrode;
a casing having a spatial area receiving and containing the electrode assembly therein and being arranged to expose the positive terminal and the negative terminal, the casing including a first side portion, a second side portion, and a central portion between the first and second side portions, a thickness of the central portion being less than that of the first and second side portions such that the casing has a dumbbell shape corresponding to that of the electrode assembly; and
a heat dissipating body receiving and holding the casing for applying pressure on the electrode assembly through the casing, an inner periphery of the heat dissipating body having a dumbbell-shaped cross section corresponding to the dumbbell shape of the casing.

2. The rechargeable battery of claim 1, wherein the central part of the electrode assembly includes a planar part centrally located and the bended parts are at ends of the planar part.

3. The rechargeable battery of claim 2, wherein the heat dissipating body includes a convex part located adjacent to the planar part, a thickness of the convex part corresponding to a thickness difference between the planar part and the bended part.

4. The rechargeable battery of claim 3, wherein the convex part comprises a flat surface contacting the casing at an area adjacent the planar part.

5. The rechargeable battery of claim 3, wherein a middle portion of the convex part protrudes toward a midplane of the heat dissipating body more than an end portion of the convex part.

6. The rechargeable battery of claim 3, wherein the convex part extends inward within the heat dissipating body.

7. The rechargeable battery of claim 1, wherein the casing is formed as a pouched structure.

8. The rechargeable battery of claim 1, wherein the heat dissipating body comprises aluminum or copper.

9. The rechargeable battery of claim 1, wherein the heat dissipating body includes a plurality of heat radiating ribs protruding to the outside of the heat dissipating body.

10. The rechargeable battery of claim 9, wherein the heat radiating ribs and the heat dissipating body are integrally formed.

11. A battery module comprising:
a plurality of unit batteries, each including an electrode assembly including bended parts at opposite ends and a central part between the bended parts, a thickness of the central part being less than that of the bended parts such that the electrode assembly has a dumbbell shape in which each of opposite sides of the central part comprises a flat surface or is protruded inward toward a midplane of the electrode assembly; and a casing having a spatial area receiving and containing the electrode assembly therein, and including a first side portion, a second side portion, and a central portion between the first and second side portions, a thickness of the central portion being less than that of the first and second side portions such that the casing has a dumbbell shape corresponding to that of the electrode assembly; and
a heat dissipating barrier receiving a respective unit battery of the plurality of unit batteries therein for applying pressure to the respective unit battery, an inner periphery of the heat dissipating barrier having a dumbbell-shaped cross section corresponding to the dumbbell shape of the casing.

12. The battery module of claim 11, wherein the heat dissipating barrier includes a plurality of heat radiating ribs fixed to a surface of the heat dissipating barrier.

13. The battery module of claim 11, wherein the heat dissipating barrier is formed in a tubular shape having a space for receiving the respective unit battery.

14. The battery module of claim 11, wherein the casing comprises a pouch structure.

15. A method for applying uniform pressure to a rechargeable battery electrode assembly housed in a casing, the electrode assembly and the casing both having a dumbbell-shaped structure, the electrode assembly including bended parts at opposite ends and a central part between the bended parts, a thickness of the central part being less than that of the bended parts, each of opposite sides of the central part comprising a flat surface or being protruded inward toward a midplane of the electrode assembly; the casing having a spatial area receiving and containing the electrode assembly therein, the casing including a first side portion, a second side portion, and a central portion between the first and second side portions, a thickness of the central portion being less than that of the first and second side portions, and the shape of the casing corresponding to that of the electrode assembly; and the method comprising forming a heat dissipating body to have an inner periphery having a dumbbell shape corresponding to the dumbbell-shaped structure, and inserting the electrode assembly housed in the casing in the heat dissipating body, such that the heat dissipating body provides pressure to the electrode assembly through the casing.

16. The rechargeable battery of claim 1, wherein the heat dissipating body comprises an arc-shaped surface contacting the casing at the central portion.

17. The rechargeable battery of claim 1, wherein the heat dissipating body has a constant thickness.

* * * * *

UNITED STATES PATENT AND TRADEMARK OFFICE
CERTIFICATE OF CORRECTION

PATENT NO. : 8,765,281 B2
APPLICATION NO. : 11/639637
DATED : July 1, 2014
INVENTOR(S) : Yong-Sam Kim It is certified that error appears in the above-identified patent and that said Letters Patent is hereby corrected as shown below:

In the Drawings

| | |
|---|---|
| FIG. 5, Sheet 3 of 5 | Delete Drawing Sheet 3 and substitute therefore the Drawing Sheet, consisting of FIGs. 4 & 5, as shown on the attached page |

In the Claims

| | |
|---|---|
| Col. 7, line 10, Claim 1 | Delete "tart corn rises", |
| | Insert --part comprises-- |

Signed and Sealed this
Sixteenth Day of August, 2016

Michelle K. Lee
*Director of the United States Patent and Trademark Office*

FIG. 4

FIG. 5